United States Patent
Nixdorff

(10) Patent No.: US 8,691,000 B2
(45) Date of Patent: Apr. 8, 2014

(54) WET GAS SCRUBBER

(75) Inventor: Henning Nixdorff, Bad Homburg v.d.H. (DE)

(73) Assignee: Outotec Oyj, Espoo (FI)

( * ) Notice: Subject to any disclaimer, the term of this patent is extended or adjusted under 35 U.S.C. 154(b) by 181 days.

(21) Appl. No.: 13/259,364

(22) PCT Filed: Mar. 31, 2010

(86) PCT No.: PCT/EP2010/002061
§ 371 (c)(1),
(2), (4) Date: Sep. 23, 2011

(87) PCT Pub. No.: WO2010/115571
PCT Pub. Date: Oct. 14, 2010

(65) Prior Publication Data
US 2012/0000366 A1    Jan. 5, 2012

(30) Foreign Application Priority Data
Apr. 9, 2009 (DE) .......................... 10 2009 016 731

(51) Int. Cl.
*B01D 47/10* (2006.01)
(52) U.S. Cl.
USPC .......... 96/312; 95/216; 96/323; 261/DIG. 54; 261/116
(58) Field of Classification Search
USPC ........ 95/216; 96/312, 275, 323; 261/DIG. 54, 261/116
See application file for complete search history.

(56) References Cited

U.S. PATENT DOCUMENTS

| | | | |
|---|---|---|---|
| 3,406,499 A | 10/1968 | Wiemer | |
| 3,746,322 A | 7/1973 | Sawyer | |
| 3,834,127 A * | 9/1974 | Jordan et al. | 96/260 |
| 3,913,399 A * | 10/1975 | Sheeks | 73/861.86 |
| 3,998,612 A | 12/1976 | Lundy | |
| 4,198,815 A * | 4/1980 | Bobo et al. | 60/737 |
| 5,178,653 A | 1/1993 | Lilja et al. | |

FOREIGN PATENT DOCUMENTS

| | | |
|---|---|---|
| DE | 1546674 A1 | 12/1970 |
| DE | 2224519 A1 | 11/1973 |
| DE | 2311314 A1 | 9/1974 |

(Continued)

OTHER PUBLICATIONS

European Patent Office, International Search Report in International Patent Application No. PCT/EP2010/002061 (Aug. 8, 2010).

*Primary Examiner* — Robert A Hopkins
*Assistant Examiner* — Cabrena Holecek
(74) *Attorney, Agent, or Firm* — Leydig, Voit & Mayer, Ltd.

(57) ABSTRACT

A wet gas scrubber is provided for removing at least one of solid and liquid particles from water-saturated gases with a Venturi zone adjustable with respect to the flow cross-section. The wet gas scrubber includes a fixed lower Venturi plate and a vertically adjustable upper Venturi plate disposed above the fixed lower Venturi plate. The Venturi plates are substantially parallel to one another and include corresponding segments configured to engage in each other. A plurality of Venturi channels are disposed between the Venturi plates and configured to guide a mixture of a gas to be cleaned and cleaning liquid droplets injected into a stream of the gas by a nozzle. The segments of the Venturi plates engage in each other while the Venturi channels are kept free.

10 Claims, 1 Drawing Sheet

(56) References Cited

FOREIGN PATENT DOCUMENTS

| | | | |
|---|---|---|---|
| DE | 3517392 | A1 | 11/1985 |
| DE | 2609022 | C2 | 7/1986 |
| DE | 69201587 | T2 | 7/1995 |
| GB | 2160120 | A | 12/1985 |
| WO | WO 2006119631 | A1 * | 11/2006 |

* cited by examiner

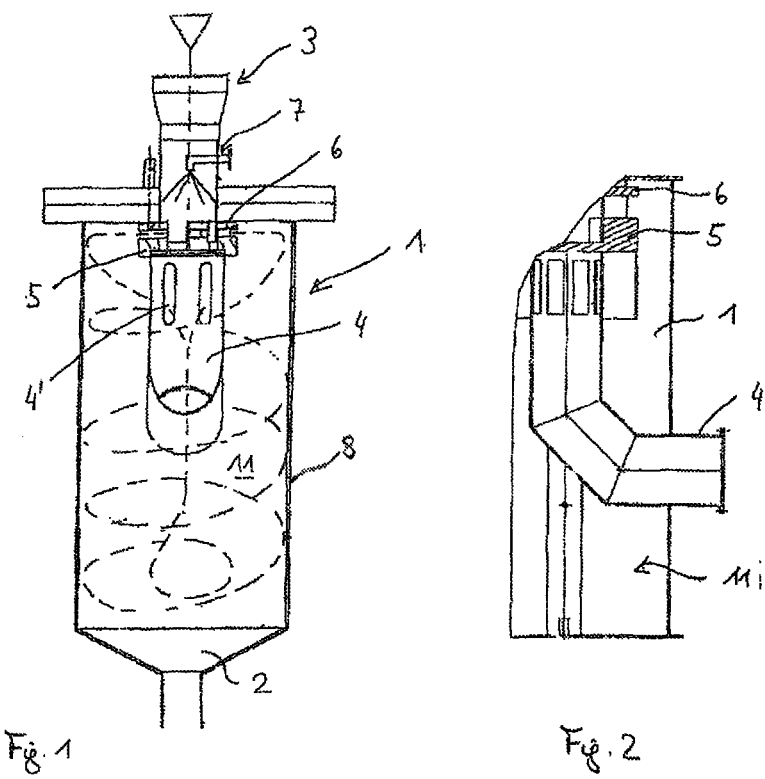
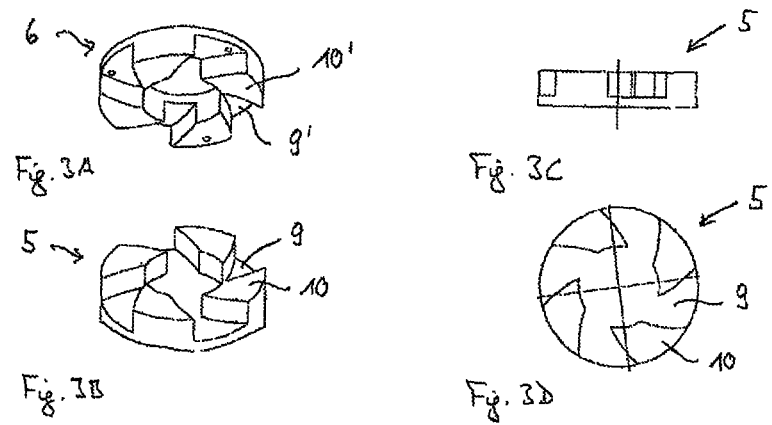
Fig. 1
Fig. 2
Fig. 3A
Fig. 3B
Fig. 3C
Fig. 3D

WET GAS SCRUBBER

CROSS-REFERENCE TO PRIOR APPLICATIONS

This application is a U.S. National Phase application under 35 U.S.C. §371 of International Application No. PCT/EP2010/002061, filed on Mar. 31, 2010, and claims benefit to German Patent Application No. DE 10 2009 016 731.5, filed on Apr. 9, 2009. The International Application was published in English on Oct. 14, 2010 as WO 2010/115571 under PCT Article 21(2).

FIELD

The present invention relates to a wet gas scrubber for removing solid and/or liquid particles from gases with a Venturi zone adjustable with respect to the flow cross-section.

BACKGROUND

Various types of wet gas scrubbers for removing solid and/or liquid particles from gases are known, including those which utilize the so-called Venturi effect. The inlet gas stream to be cleaned here is utilized to decompose the cleaning liquid into extremely fine droplets which capture particle- and droplet-shaped impurities from the gas stream to be cleaned and can thus be discharged.

Simple Venturi gas scrubbers have a central throat region with constant cross-section, to the inlet side of which a cone narrowing in flow direction is adjoined and to the outlet side of which a cone expanding in flow direction is adjoined. Therefore, such gas scrubbers can only be used effectively over small range of gas flow rates. For this reason, more expensive Venturi gas scrubbers have already been proposed, in which the cross-section of the throat region can be varied for different gas flow rates, in order to maintain the cleaning effect.

SUMMARY

In an embodiment, the present invention provides a wet gas scrubber for removing at least one of solid and liquid particles from water-saturated gases with a Venturi zone adjustable with respect to a flow cross-section. The wet gas scrubber includes a fixed lower Venturi plate and a vertically adjustable upper Venturi plate disposed above the fixed lower Venturi plate. The Venturi plates are substantially parallel to one another and include corresponding segments configured to engage each other. The segments of the Venturi plates engage each other while the Venturi channels are kept free so as to from a plurality of Venturi channels between the Venturi plates and configured to guide a mixture of a gas to be cleaned and cleaning liquid droplets injected into a stream of the gas by a nozzle.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 schematically shows a vertical section through an embodiment of a wet gas scrubber, FIG. 2 shows a partial section through a modified version of the wet gas scrubber as shown in FIG. 1, and FIG. 3A-D show the Venturi plates used for example in the wet gas scrubber in an enlarged representation as compared to FIGS. 1 and 2 in perspective, side and top views.

DETAILED DESCRIPTION

In an embodiment, the present invention provides a wet gas scrubber for removing solid and/or liquid particles from gases with a Venturi zone adjustable with respect to the flow cross-section comprising a plurality of Venturi channels through which a mixture of the gas to be cleaned and the cleaning liquid droplets injected into the gas stream through a nozzle is guided.

It is an aspect of the present invention to obtain an adjustable Venturi cleaning zone in a wet gas scrubber as mentioned above, in which a uniform gas velocity and consequently a uniform pressure drop is effected in a simple way, even if the flowing gas volume fluctuates, so that a uniform cleaning effect can always be achieved.

In accordance with an embodiment of the invention, a wet gas scrubber includes Venturi channels that are formed between two substantially parallel Venturi plates provided with segments preferably arranged in a star shape, which engage in each other while the Venturi channels are kept free. The vertical gas stream is deflected horizontally, wherein gas and liquid in the Venturi channels undergo a strong acceleration. This results in the generation of a large number of extremely fine droplets and an intensive, thorough mixing with the particles.

Preferably, the Venturi plates can be adjusted in their distance relative to each other. In this way, a constantly high cleaning effect can be achieved even with greater fluctuations of the volumetric gas flow, because by relative adjustment of the coaxial Venturi plates the Venturi channel cross-sections can synchronously be adjusted and hence the total Venturi channel cross-section can be adjusted.

Advantageously, the adjustment of the Venturi Plates relative to each other preferably can be controlled automatically in dependence on the changing difference of the gas pressure before and after the Venturi zone, i.e. between inlet cone and outlet cone of the Venturi zone.

To direct the stream of the gas to be cleaned in a preferred direction, the Venturi channels formed between the Venturi plates extend substantially radially and are curved in the same direction in accordance with a particular embodiment of the invention. They are distributed over the Venturi plates in a star shape at the same angular intervals, in order to achieve a uniform flow pattern.

For a simple construction and easy handling of the wet gas scrubber of an embodiment of the invention the two Venturi plates advantageously lie one above the other, and preferably the lower Venturi plate is fixed and the upper Venturi plate is vertically adjustable.

In accordance with an embodiment of the invention, a reliable control of a uniform pressure drop in the Venturi zone can be achieved in that the one Venturi plate substantially has the negative shape of the second Venturi plate.

An even more complete cleaning of the gases with the wet gas scrubber of an embodiment of the invention can be achieved in that the gas leaving the Venturi zone enters a second cleaning zone constituting a cyclone with a spin, in which second cleaning zone the solid and/or liquid particles from the gas are captured by the injected cleaning liquid droplets, guided to the housing wall of the cyclone and discharged from the same for instance due to gravity.

For this purpose, the mixture of gas to be cleaned and cleaning liquid droplets is introduced into the Venturi zone preferably vertically from the top to the bottom, so that it can leave the Venturi zone horizontally into the cyclone. Carry-over of droplets into the cleaned gas stream is minimized.

The cleaned gas then can be guided out of the housing of the cyclone, which the captured solid and/or liquid particles leave in downward direction, through a central upper outlet.

The measure that the two cleaning zones are accommodated in one and the same housing serves for a compact and protected construction of the wet gas scrubber.

The wet gas scrubber shown in FIG. 1 serves to remove solid and/or liquid particles from water-saturated gases with constantly high cleaning efficiency. An adjustable Venturi cleaning zone, formed by two horizontally arranged Venturi plates 5, 6 adjustable in their relative distance to each other, ensures the uniform cleaning efficiency in that a uniform gas velocity and consequently a uniform pressure drop is achieved with a fluctuating gas volume.

The adjustable Venturi zone includes a plurality of curved Venturi channels 9, 9' which extend from radially inside to radially outside between correspondingly designed protruding segments 10, 10' of the Venturi plates 5, 6.

Via a nozzle 7, cleaning liquid is injected into the gas to be cleaned, which is introduced into the wet gas scrubber from above, before it reaches the Venturi zone. The mixture of gas to be cleaned and cleaning liquid droplets then gets into the horizontal, but curved Venturi channels 9, 9', whose flow cross-section can be varied simultaneously by adjusting the distance of the Venturi plates 5, 6. The mixture flows out of the Venturi zone with a spin along the outer periphery and gets into a second cleaning stage which is formed as a cyclone cleaner 11. The two cleaning zones are accommodated in a common housing 1.

In the cyclone region, the solid and/or liquid particles are captured by the cleaning liquid droplets and precipitated on the housing wall 8, where they are downwardly discharged from the conical outlet 2. In the modified embodiment shown in FIG. 2, the housing has a flat bottom. The solid and/or liquid particles then can be withdrawn, e.g. also through a non-illustrated lateral outlet.

The cleaned gas flows upwards in the housing 1, gets into a central gas outlet 4 via outlet slots 4' and exits to the outside.

In operation, as shown in the drawing, the water-saturated gas and the injected cleaning liquid initially flow vertically into the Venturi zone, which is formed by the Venturi plates 5, 6 equipped with curved Venturi channels 9, 9'. A stationary lower Venturi plate 5 equipped with protruding segments 10, which together with an upper vertically adjustable Venturi plate 6 equipped with protruding segments 10' forms a plurality of Venturi channels 9, 9', deflects the gas/liquid mixture into the horizontal. The vertical gas/liquid stream gets into the horizontal star-shaped Venturi channels 9, 9', where it is accelerated. The high velocity in the small throat region of the individual Venturi channels 9, 9' of the Venturi zone generates a large number of very fine liquid droplets. The particles contained in the gas are intensively mixed with the mist of these tiny liquid droplets. Due to the high relative velocity between droplets, particles and gas, the particles are captured by the droplets.

Even with a fluctuating gas flow, the gas pressure drop is kept constant by regulating the total flow cross-section of the Venturi channels 9, 9'. The adjustment of cross-section is effected with the second Venturi plate 6, which represents a negative shape of the lower, stationary Venturi plate 5, so that the two plates 5, 6 can plunge into each other more or less, in order to determine the Venturi cross-section of the Venturi throat. This adjustment can be effected automatically, controlled by setpoints of the gas pressure difference across the Venturi zone.

The mixture of gas and cleaning liquid droplets emerging from the Venturi zone receives a spin due to the horizontal star-shaped and curved design of the Venturi channels 9, 9', i.e. it enters the cyclone cleaner 11 with a spin. The liquid droplets, the particles and the gas are caused to rotate due to a centrifugal force along the housing wall 8 thereof. This force causes an additional agglomeration of particles and liquid droplets. Due to the helical movement of the mixture of gas and liquid droplets, the latter and the particles are separated and collected in the cone-shaped outlet 2 of the housing 8, whereas the cleaned gas flows upwards into the central outlet 4 and to the outside.

Therefore, an embodiment of the present invention includes an infinitely variably adjustable four-channel Venturi cleaning zone. The flow cross-section and the shape of the entire Venturi cleaning zone are adjustable proportional to the pressure gradient, so that the gas flow model remains unchanged for each cross-sectional size. The adjustment of the individual Venturi channels is effected synchronously. Due to the curved Venturi outlet diffuser, an additional cyclone effect is obtained. The Venturi cleaning zone and the cyclone cleaning zone are combined in one and the same housing.

An automatic control is effected via the pressure drop, so that in the case of fluctuating gas flows the cleaning efficiency remains the same. There are no uncontrolled turbulences and a carry-over of droplets is minimized. Furthermore, certain cleaning effects can be preselected. The adjustment of the cleaning effect can be accomplished from outside.

While the invention has been described with reference to particular embodiments thereof, it will be understood by those having ordinary skill the art that various changes may be made therein without departing from the scope and spirit of the invention. Features described herein can be used in any combination. Further, the present invention is not limited to the embodiments described herein; reference should be had to the appended claims.

LIST OF REFERENCE NUMERALS 1 housing
2 outlet
3 gas inlet
4 gas outlet
4' outlet slots
5 lower Venturi plate
6 upper Venturi plate
7 nozzle
8 housing wall
9, 9' Venturi channels
10, 10' segments
11 cyclone cleaner

The invention claimed is:

1. A wet gas scrubber for removing at least one of solid and liquid particles from water-saturated gases with a Venturi zone adjustable with respect to a flow cross-section, the wet gas scrubber comprising:
   a fixed lower Venturi plate; and
   a vertically adjustable upper Venturi plate disposed above the fixed lower Venturi plate, the Venturi plates being substantially parallel to one another and including corresponding segments configured to engage each other so as to form the Venturi zone including a plurality of Venturi channels each extending between respective ones of the corresponding segments, the Venturi channels extending radially and being curved from a radially inside position to a radially outside position such that a mixture of gas to be cleaned and cleaning liquid droplets injected into a stream of the gas by a nozzle flow out of the Venturi zone with a spin.

2. The wet gas scrubber according to claim 1, wherein the segments of the Venturi plates are arranged in a star shape.

3. The wet gas scrubber according to claim 1, wherein a distance of the Venturi plates relative to each other is variable.

4. The wet gas scrubber according to claim 3, wherein the distance of the Venturi plates relative to each other is automatically controlled based on a changing difference of a pressure of the gas before and after the Venturi zone.

5. The wet gas scrubber according to claim 1, wherein one of the Venturi plates substantially includes a negative shape of the other Venturi plate.

6. The wet gas scrubber according to claim 1, further comprising a second cleaning zone including a cyclone having a housing with a housing wall, the second cleaning zone being configured to receive the gas leaving the Venturi zone with a spin so as to capture the at least one of the solid and liquid particles from the gas by the injected cleaning liquid droplets, guide the at least one of the solid and liquid particles to the housing wall of the cyclone and discharge the at least one of the solid and liquid particles from the second cleaning zone.

7. The wet gas scrubber according to claim 6, wherein the housing is configured to guide the gas out of the housing through a central upper outlet and to direct the captured at least one of the solid and liquid particles out of the housing in a downward direction.

8. The wet gas scrubber according to claim 7, wherein the housing includes the Venturi zone and the second cleaning zone.

9. The wet gas scrubber according to claim 6, wherein the housing includes the Venturi zone and the second cleaning zone.

10. The wet gas scrubber according to claim 1, wherein the wet gas scrubber is configured to vertically introduce the mixture of the gas to be cleaned and the cleaning liquid droplets into the Venturi zone from a top to a bottom and to guide the mixture horizontally to an outside into a cyclone.

* * * * *